United States Patent
Moran (10) Patent No.: US 11,042,129 B2
(45) Date of Patent: Jun. 22, 2021

(54) REDUNDANT WIRELESS SAFETY SYSTEM FOR MANUFACTURING ENVIRONMENT

(71) Applicant: CONTROL DYNAMICS, INC., Everett, WA (US)

(72) Inventor: Eric M. Moran, Camano Island, WA (US)

(73) Assignee: Control Dynamics, Inc., Everett, WA (US)

( * ) Notice: Subject to any disclaimer, the term of this patent is extended or adjusted under 35 U.S.C. 154(b) by 224 days.

(21) Appl. No.: 16/432,701

(22) Filed: Jun. 5, 2019

(65) Prior Publication Data

US 2020/0387118 A1    Dec. 10, 2020

(51) Int. Cl.
| | | |
|---|---|---|
| *B66F 11/04* | (2006.01) | |
| *G05B 9/03* | (2006.01) | |
| *H04W 4/80* | (2018.01) | |
| *B66F 17/00* | (2006.01) | |
| *B66F 9/075* | (2006.01) | |

(52) U.S. Cl.
CPC .............. *G05B 9/03* (2013.01); *B66F 11/042* (2013.01); *H04W 4/80* (2018.02); *B66F 9/0755* (2013.01); *B66F 17/006* (2013.01)

(58) Field of Classification Search
CPC ........... G06B 9/03; H04W 4/80; B66F 11/042
USPC .......................................................... 700/79
See application file for complete search history.

(56) References Cited

U.S. PATENT DOCUMENTS

| | | |
|---|---|---|
| 2,903,774 A | 9/1959 | Harley |
| 3,090,092 A | 5/1963 | Szemplak et al. |
| 3,644,967 A | 2/1972 | Romanzi, Jr. et al. |
| 5,033,171 A | 7/1991 | Kasai |
| 5,144,725 A | 9/1992 | Krauss |
| 5,383,257 A | 1/1995 | Krauss |
| 5,548,879 A | 8/1996 | Wu |
| 5,556,415 A | 9/1996 | McEwen et al. |

(Continued)

OTHER PUBLICATIONS

DB Industries, Inc., DBI SALA Manual, "DBI SALA EXOFIT," pp. 1-32, see p. 20.

(Continued)

*Primary Examiner* — Ly D Pham
(74) *Attorney, Agent, or Firm* — FisherBroyles LLP; Kevin D. Jablonski (57) ABSTRACT

Systems and methods for a redundant wireless safety system that provides a second level of safety protocol when a worker is exposed to a more dangerous work environment. In an embodiment, such a machine may be configured to perform a specific manufacturing function wherein the machine may include first and second transceivers for maintaining enabling signals for functionality of the machine. The system may further include a base station (e.g., remote control) configured to operate in conjunction with the machine that in turn includes third and fourth transceivers also configured to maintain enabling signals for machine functionality. Machine functionality may be interrupted by an interrupt switch disposed in the machine. That is, the interrupt switch may be configured to enable functionality of the machine if and only if the first transceiver maintains periodic communication with the third transceiver and if the second transceiver maintains periodic communication with the fourth transceiver.

20 Claims, 6 Drawing Sheets

(56) References Cited

U.S. PATENT DOCUMENTS

| | | |
|---|---|---|
| 6,265,983 B1 | 7/2001 | Baillargeon |
| 6,668,434 B2 | 12/2003 | Casebolt et al. |
| 6,965,231 B1 | 11/2005 | Cinoglu et al. |
| 7,077,372 B2 | 7/2006 | Moran |
| 7,114,225 B2 | 10/2006 | Casebolt et al. |
| 7,261,264 B2 | 8/2007 | Moran |
| 7,275,613 B2 | 10/2007 | Park |
| 7,375,517 B1 | 5/2008 | Cinoglu et al. |
| 7,726,706 B2 | 6/2010 | Moran |
| 7,902,960 B2 | 3/2011 | Tsuchimochi et al. |
| 8,240,012 B2 | 8/2012 | Walega et al. |
| 9,238,573 B2 | 1/2016 | Luminet et al. |
| 9,402,447 B2 | 8/2016 | Hortnagle |
| 9,578,929 B2 | 2/2017 | Hung |
| 2002/0145515 A1 | 10/2002 | Snowbarger et al. |
| 2002/0170783 A1 | 11/2002 | Goode |
| 2002/0184742 A1 | 12/2002 | Casebolt et al. |
| 2004/0227626 A1 | 11/2004 | Almaraz et al. |
| 2006/0048350 A1 | 3/2006 | Coulombe et al. |
| 2006/0222287 A1 | 10/2006 | Gulvin et al. |
| 2009/0078501 A1 | 3/2009 | Mordecai et al. |
| 2009/0243892 A1 | 10/2009 | Cheung |
| 2010/0013622 A1 | 1/2010 | Rumps et al. |
| 2010/0026025 A1 | 2/2010 | McKay |
| 2010/0101060 A1 | 4/2010 | Walega et al. |
| 2010/0243373 A1 | 9/2010 | Johnson et al. |
| 2011/0162177 A1 | 7/2011 | Von Der Ahe et al. |
| 2011/0239413 A1 | 10/2011 | Milbright |
| 2012/0124790 A1 | 5/2012 | Richards |
| 2013/0199854 A1 | 8/2013 | Bagnaro |
| 2014/0067668 A1 | 3/2014 | Bellamy et al. |
| 2014/0251725 A1 | 9/2014 | Schurian et al. |
| 2014/0298630 A1 | 10/2014 | Hortnagl |
| 2015/0074958 A1 | 3/2015 | Hung |
| 2015/0089777 A1 | 4/2015 | Hung |
| 2017/0000219 A1 | 1/2017 | Moran |
| 2017/0084088 A1* | 3/2017 | Reichardt .............. G05B 15/02 |
| 2017/0335583 A1 | 11/2017 | Moran |

OTHER PUBLICATIONS

Guardian Fall Protection, Instruction Manual, "Velocity SRL," pp. 1-8.

International Searching Authority of WIPO; Int'l Search Report & Written Opinion dated Jul. 14, 2016; PCT/US2016/028985; pp. 1-10.

International Searching Authority of WIPO; Int'l Search Report & Written Opinion dated Jul. 27, 2018; PCT/US18/30703; pp. 1-9.

Supplemental European Search Report; dated Nov. 23, 2018; EP 16818381.2; pp. 1-8.

\* cited by examiner

REDUNDANT WIRELESS SAFETY SYSTEM FOR MANUFACTURING ENVIRONMENT

BACKGROUND

Manufacturing environments can be dangerous places for working with many interconnected machines operating with human control as well as automated control. Several governing bodies, (e.g., OSHA, state and local ordinances, and the like) require safety protocols to be observed at all times. Further, manufacturing companies may employ even more robust and all-inclusive safety standards to ensure utmost care is taken to eliminate accidents and injuries. However, as automation and remotely-controlled systems become more prevalent, confusion may ensue as to how to best accomplish safety to exacting standards.

For example, some automated systems may start up according to automated procedures controlled by a computer system while a worker is in harm's way. Such a situation may be difficult to predict for the worker. Further, some equipment may be controlled by a remote operator at a remote-control station. As such, a first worker may engage in operating said equipment without realizing that a second worker is still in harm's way. Further yet, even if all workers have followed proper safety protocol, systemic failures and routine wear-and-tear may degrade existing safety systems to the point of failure. If such systems do not have a default fail-to-safe design, accidents or injuries may still occur despite workers' best safety efforts.

As such, additional safety system in specific manufacturing environments may be needed to increase safety in many situations.

BRIEF DESCRIPTION OF THE DRAWINGS

Like reference numerals are used to designate like parts throughout the several view of the drawings, wherein.

DETAILED DESCRIPTION

The subject matter of embodiments disclosed herein is described herewith specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Embodiments will be described more fully hereinafter with reference to the accompanying drawings, which form a part hereof, and which show, by way of illustration, exemplary embodiments by which the systems and methods described herein may be practiced. This systems and methods may, however, be embodied in many different forms and should not be construed as limited to the embodiments set forth herein; rather, these embodiments are provided so that this disclosure will satisfy the statutory requirements and convey the scope of the subject matter to those skilled in the art.

Byway of an overview, systems and methods disclosed herein are directed to a redundant wireless safety system that provides a second level of safety protocol when a worker is exposed to a more dangerous work environment. Often times, machines and devices in a manufacturing setting present inherently dangerous working environments such that a worker may be required to have fall-protection safety systems engaged or other safety equipment such as breathing apparatuses, fire suppression systems, or other systems designed to protect workers. In an embodiment, such a machine may be configured to perform a specific manufacturing function wherein the machine may include first and second transceivers for maintaining enabling signals for functionality of the machine. The system may further include a base station (e.g., remote control) configured to operate in conjunction with the machine that in turn includes third and fourth transceivers also configured to maintain enabling signals for machine functionality. In an effort to provide redundant safety, machine functionality may be interrupted by an interrupt switch disposed in the machine, That is the interrupt switch may be configured to enable functionality of the machine if and only if the first transceiver maintains periodic communication with the third transceiver and if the second transceiver maintains periodic communication with the fourth transceiver.

Such a redundant wireless safety system may be useful in situations where remote control of a machine or device may put a worker in harm's way. Specifically, a worker who is working in a lift basket of a lift system may have a safety harness that provides positive electronic indication of being secured. The communication may often be wireless (e.g., near-field communication or IEEE 1492 standard communications) between the respective transceivers, but in some embodiments, the communications channels may be wired communication channels. The system may further include local indicator lights both at the machine and at the base station that may be illuminated when the redundant communications are maintained. The system may further include specific locking mechanisms designed to provide further levels of redundancy by having electronic switches disposed inside to positively indicate a secured connection. These and other aspects are described and better understood with respect to FIGS. 1-6.

Figure 1:
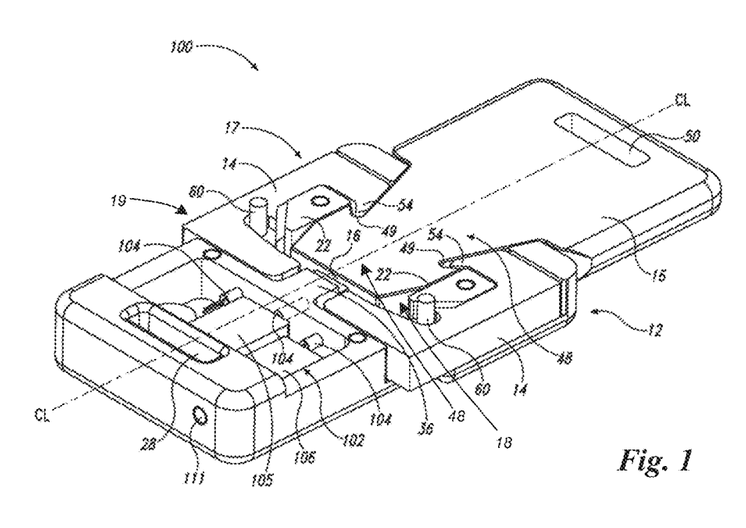
FIG. 1 is a perspective view of an assembled locking mechanism having a receiver base, a pair of pivotable locking tabs about respective cylindrical posts, and an insert (illustrated without a cover) according to an embodiment of the subject matter disclosed herein.

FIG. 1 is a perspective view of an assembled locking mechanism having a receiver base, a pair of pivotable locking tabs about respective cylindrical posts, and an insert (illustrated without a cover) according to an embodiment of the subject matter disclosed herein. As shown, a suitable locking mechanism 100 brings two device components together and maintains the connection until such time the connection is intentionally broken while providing a positive connection signal to a remote system for redundant safety purposes. In the embodiment shown in FIG. 1, the locking mechanism 100 includes a receiver base 12, a pair of pivotable locking tabs 14, and an insert 16 of which a portion is received within a cavity 18 of receiver base 12 and held in place by locking tabs 14.

Receiver base 12 includes two spaced-apart and outwardly-projecting chocks 22 that conform to the shape of an interior surface of locking tabs 14 and further define the boundaries of the cavity 18 in which a portion of insert 16 is received. Receiver base 12 also includes a lower section that is configured to engage a first device. According to one embodiment, lower section contains an opening 28. The opening may be an elongated slot to accommodate a safety strap (not shown) that is operatively connected to the locking mechanism 100, such as a safety harness for example. Opening 28 may be aligned below cavity 18 relative to centerline CL of receiver base 12.

Insert 16 may be in the form of a solid planar slab having a lower portion that includes an external "key like" projection having a leading edge. In one form, the transition and the "key like" projection are received into cavity 18 of receiver base 12 along centerline CL when the insert is inserted into the receiver base in order to lock the locking mechanism 100. In the fully locked position, end surface abuts the center ledge of the receiver base 12, or, alternatively, the central abutment member 36 as illustrated in FIG. 1. Opposite end surface within slab 42 is an opening 50 that engages an object, such as a safety strap. Opening 50 may be an elongated slot similar to opening 28 within receiver base 12.

Insert 16 is configured to be centerline-received into cavity 18 with "key like" projection 44 and at least part of transition section 48 being able to be inserted within cavity 18 formed by receiver base 12, locking tabs 14, and chocks 22. In one form, leading edge 46 abuts central ledge 32 or central abutment 36. Opening 50 within insert 16 is aligned above opening 28 of the lower portion of receiver base 12.

Locking tab 14 may be of various shapes. The locking tabs each have a first arm 17 and a second arm 19 extending outwardly from a central point (the pivot point) where the first arm, second arm and pivot may form a general "L" shape. The first arm engages the lower portion of the insert, i.e., the "key like" projection and at least a portion of transition section 48. According to one embodiment, each locking tab has a top portion that may be configured with a hook nose 54, a side portion and bottom portion. Top portion, side portion, and bottom portion form an elongated "c-shaped" cavity 58 that corresponds to the shape of chock 22. In one form, the locking tabs' outer surfaces (defined by the top portion, side portion, and bottom portion) have generally straight surfaces so that the exterior appears to be a partial rectangle. The second arm of each locking tab includes an upper surface 59 that is configured to contact leading edge 46 of insert 16 during unlocking. The second arm further includes a lower surface that may rest on central ledge 32 of receiver base 12 when the locking mechanism is locked.

A cylindrical post 60 is inserted axially through bottom portion and operatively connected to receiver base 12 (such as press fit connected into a tapped and threaded hole or through other standard fastening means well known in the industry). In this way, bottom portion, side portion, and top portion with nose 54 pivot about cylinder post 60 and are rotationally limited by its corresponding chock 22 and central ledge 32, as well as engagement with pocket 49 by nose 54 when insert projection 44 and at least a portion of the insert transition section 48 is inserted into cavity 18.

When the locking mechanism 100 is in the fully locked position, the exposed parts are mostly planar, which makes the locking mechanism 100 less likely to get snagged or hooked during use. When the locking mechanism 100 is unlocked, each first arm 17 extends beyond outer edges of the receiver base 18. The extending first arms 17 past the receiver base 18 are visible to a worker or third parties. Further, the outer edges of the insert 16, receiver base 18, and locking tabs 14 may be chamfered to further reduce the potential of snags or hang ups.

The receiver base 12 also includes an electronic bay 102 that includes various electronic components to verify that insert 16 is fully engaged into cavity 18 and latched by locking tabs 14. The electronic components may be configured to send a signal to an external device (such as a computer) that determines whether the locking mechanism 100 can open and release the insert 16. The electronic components may include embedded reed switches 104, a circuit board 105, a relay 106, embedded shielded proximity switches, a pressure switch that has mechanical engagement, an optical sensor, and optional indicator light (e.g., LED light) and a battery. These are positioned within the electronic bay 102. There are also magnetic actuators, preferably three, to match a corresponding reed switch 104. Magnetic actuators are positioned outside the electronic bay.

The reed switches 104 may be a Hamlin 59010 Firecracker (3 mm dia., 9 mm long). They will be activated by the magnetic actuators placed in three locations opposite the reed switches. One location will be at the end of the insert 16, another under the left-hand locking tab 14, and the remaining one under the right-hand locking tab 14. All three switches will normally be in the open position until the magnetic actuator changes their state.

After all three switches are closed by the mechanical action of inserting the insert 16 into the receiver base cavity (one-stage locking), then the electronic components will receive electrical energy from the battery. After the electronic components have communicated via various protocols, such as Bluetooth, near field communication, RFID, Zigbee, or other wireless communication means, that the mechanical (stage one) locking has taken place, a second stage verification may be accomplished. Here, in the second stage, the locking mechanism 100, through mechanical closure, triggers a communication between the locking mechanism 100 to a machine (not illustrated) that may be attached to or a controller 124 that may be interfaced with a machine or multiple machines or to a complete overall monitoring system.

The two-stage locking mechanism with verification capabilities (e.g., remote processor signaling) is particularly useful for dangerous applications where human life (or safety) is at risk or where sensitive expensive equipment is at risk. One application for the two-stage locking mechanism 100 is between a worker in a safety harness and a retractable lifeline where an employer (or construction boss) needs to ascertain with more certainty whether it is safe for a worker to detach from a lifeline. The connection or disconnection can be signaled to a controller (not shown), which can be forwarded to a computer device (not shown) that can be networked with an internal or external safety monitor command center (not illustrated). Further, the locking mechanism 100 allows a worker to remove him or herself from a lifeline without removing the worker's safety harness. The above-described locking mechanism 100 may be used in conjunction with the overall redundant safety system that is described during the remainder of this disclosure with respect to FIGS. 2-6.

Figure 2:
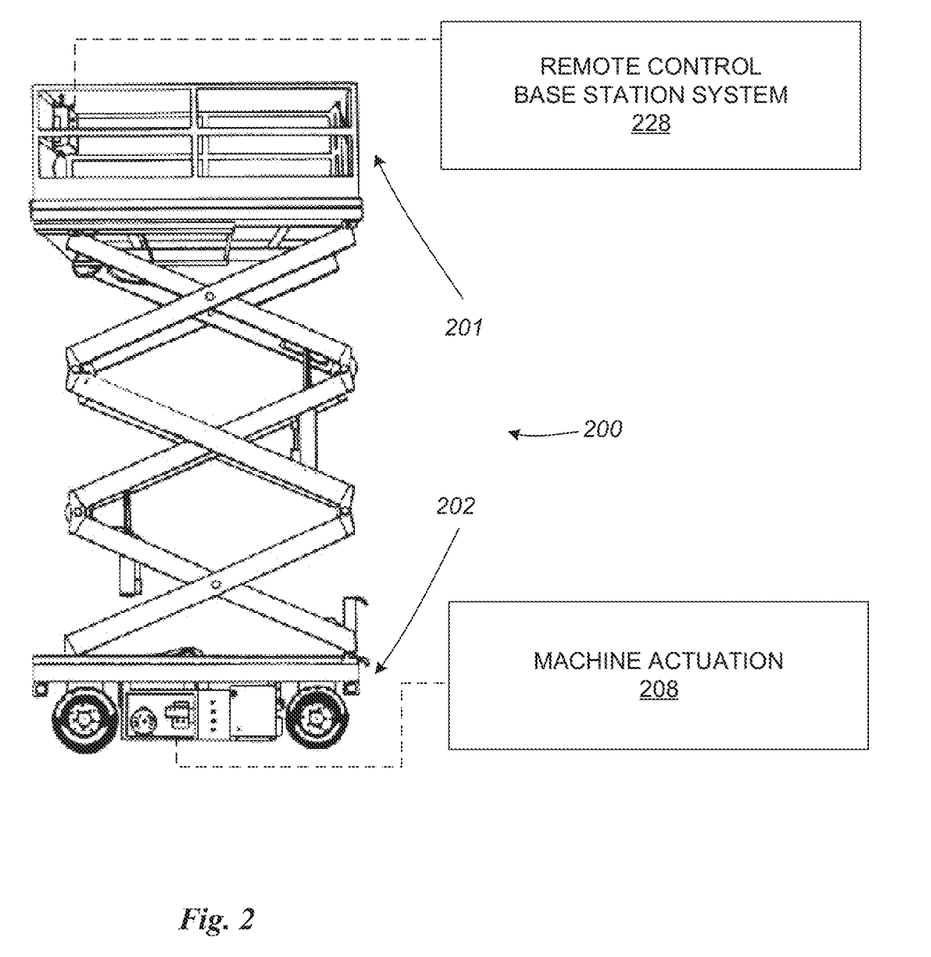
FIG. 2 is a diagram of a human lift system having a redundant safety system disposed therein according to an embodiment of the subject matter disclosed herein.

FIG. 2 is a diagram of a human lift system 200 (or other mobile elevated work platform (MEWP)) having a redundant safety system disposed therein according to an embodiment of the subject matter disclosed herein. The human lift system shown is a scissor-style human lift 200 where a worker may be in the basket portion 201 of the human lift system to be lifted up to a working position. Additionally, a machine actuator portion 202 may be disposed at the base of the human lift machine 200 and configured to move the entire lift system 200 in a lateral direction. Further, a worker situated in the basket portion may utilize a control base station 128 (e.g. a remote control) to actuate various functions of the human lift system 200. For example, the worker may control a machine actuation controller 208 via the remote-control base station 228 to move the basket portion 201 up and down or to move the machine actuator portion 202 in a lateral direction.

Typically, a worker situated in the basket portion 201 may be engaged with a safety harness (not shown) having one or more locking mechanisms as shown in FIG. 1. The locking mechanism(s) may have an electronic signal that is indicative of a positive engagement. That is, if the locking mechanism(s) is engaged and secured properly, then a positive safe signal may be generated and used with outside control systems. Thus, various machine actuation functions may be disabled if the positive coupling signal is not present for the locking mechanism(s). In this manner, a worker who is not properly secured with the required safety harness utilizing the locking mechanism(s) may not risk injury from falling out of the basket in the case is some manner of an accident as the machine will be locked out of functionality until the positive coupling indication is received.

Similarly, though not shown, the systems and methods described herein may also be used with any automated guided vehicle wherein a human may be put in harm's way. Further yet, the systems and methods may be used in conjunction with safety fences and gates that are required to be closed and/or secured prior to action taken by a worker. For example, a worker who may be working from an elevated platform may have the functionality of tools locked out until a redundant wireless safety system determines that vertically raising safety fences are properly raised and locked into use. These and other safety features may be redundant as described next with respect to FIG. 3.

Figure 3:
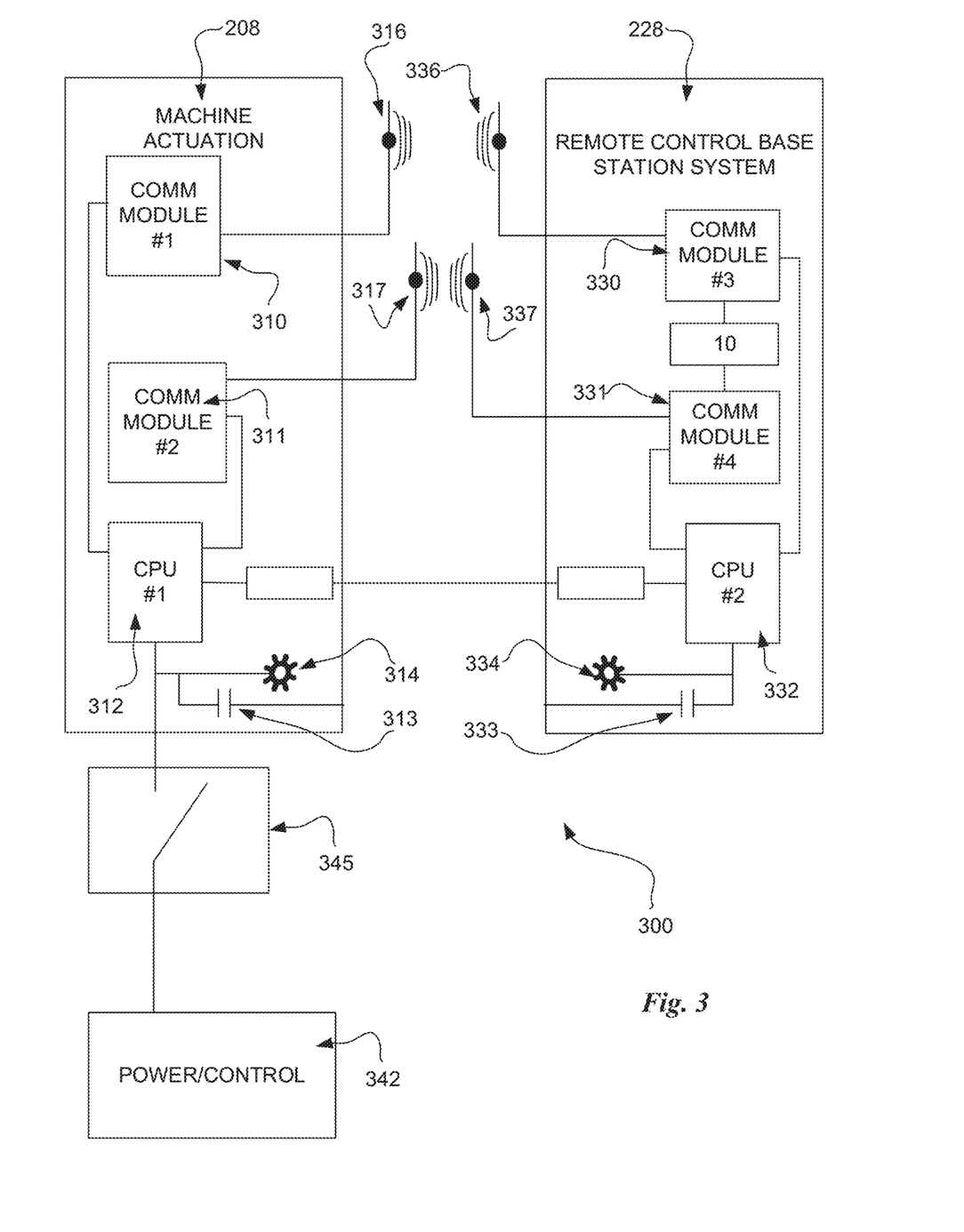
FIG. 3 is a block diagram of a redundant safety system suitable for use in machines deployed in a manufacturing environment according to an embodiment of the subject matter disclosed herein.

FIG. 3 is a block diagram of a redundant safety system 300 suitable for use in machines deployed in a manufacturing environment according to an embodiment of the subject matter disclosed herein. This block diagram shows various modules and computing blocks as well as communication channels suited for use in the system of FIG. 2. As such, FIG. 3 shows the machine actuation portion 208 of the system 300 in communication with the remote-control base station portion 228 of the system 300. The communication may be wireless through one or more wireless communication protocols such as a near-field communication protocol (e.g., Bluetooth) or a switched packet wireless network protocol (e.g., IEEE 1492). Further, this communication may be characterized as redundant in that more than one distinct communication channel is established between the machine actuation module 208 and the remote-control base station module 228. Further, the system 300 may further comprise a safety harness having a multiple verification point device (e.g., a locking mechanism 10) that is configured to enable functionality all communication to and from any transceiver disposed therein.

Specifically, the machine actuation module 208 includes a first communication module 310 and a second communication module 311 (e.g., transceivers). Similarly, the remote-control base station includes a first communication module 330 (third overall) and a second communication module 331 (fourth overall) (e.g., transceivers). Each of these communication modules may be controlled by respective processors 312 and 332. With these components, the first communication module 310 (in the machine actuation module 208) may be configured to communicate with the third communication module 330 (in the remote-control base station module 228) via respective antennae 316 and 336. Similarly, and in a redundant manner, the second communication module 311 (in the machine actuation module 208) may be configured to communicate with the fourth communication module 331 (in the remote-control base station module 228) via respective antennae 317 and 337.

In one embodiment, the remote-control base station module 228 includes enabling signals to each of the respective communication modules 330 and 331 from one or more locking mechanisms 10. As discussed above, when a respective locking mechanism 10 is properly situated and secured, it may provide a positive signal indicative of properly secured locking mechanisms (e.g., for a safety harness for a worker). Thus, this positive indication signal may be utilized by the respective communication modules 330 and 331 for enabling the ping and response handshake. That is, if the positive indication signal is not received at both communication modules 330 and 331, neither of the communication modules 330 and 331 will be enabled to function thereby locking out machine actuation as described below. That is, the indicator light 314 disposed in the machine actuation portion 208 is configured to be illuminated if and only if the first transceiver 310 maintains periodic communication with the third transceiver 330 and if the second transceiver 311 maintains periodic communication with the fourth transceiver 331. Alternatively, or in addition to the indicator light 314, a contact switch 313 may also be closed if and only if the first transceiver 310 maintains periodic communication with the third transceiver 330 and if the second transceiver 311 maintains periodic communication with the fourth transceiver 331. The contact 313 may be used to provide a signal to remotely located enablement devices (e.g., power supply, control panel lockout, and the like). Similarly, the indicator light 334 disposed in the remote-control base station 228 is configured to be illuminated if and only if the first transceiver 310 maintains periodic communication with the third transceiver 330 and if the second transceiver 311 maintains periodic communication with the fourth transceiver 331. Alternatively, or in addition to the indicator light 334, a contact switch 333 may also be closed if and only if the first transceiver 310 maintains periodic communication with the third transceiver 330 and if the second transceiver 311 maintains periodic communication with the fourth transceiver 331. The contact 333 may be used to provide a signal to remotely located enablement devices (e.g., power supply, control panel lockout, and the like).

With this redundant configuration of transceivers and wireless communication channels, continuous, periodic communication links may be established between first and third communication modules 310 and 330 as well as second and fourth communication modules 311 and 331, respectively. In one embodiment, the periodic communication link may comprise a ping and response handshake between modules every second. Other periods are contemplated including intervals as high as 30 seconds and periods as low as in the range of milliseconds. Further, so long as said periodic communication link is maintained, respective indicator lights 314 and 334 may be illuminated and/or contacts 313 and 333 closed indicating a properly engaged redundant safety system.

The maintaining of these periodic ping and response handshakes provides a basis to ensure that the safety equipment being used by a worker continues to function correctly and is deployed properly. That is, so long as the periodic ping and response handshake is perfected for each communication channel, the functionality of the machine actuation module will still be enabled. If one or both ping and response handshakes fail, the power and control features 342 of the machine actuation module 208 may be interrupted via interrupt switch 345. In some embodiments, the interrupting may not be engaged until two or more consecutive ping and response handshake failures thereby allowing for single handshake failures without interrupting functionality.

Figure 4:
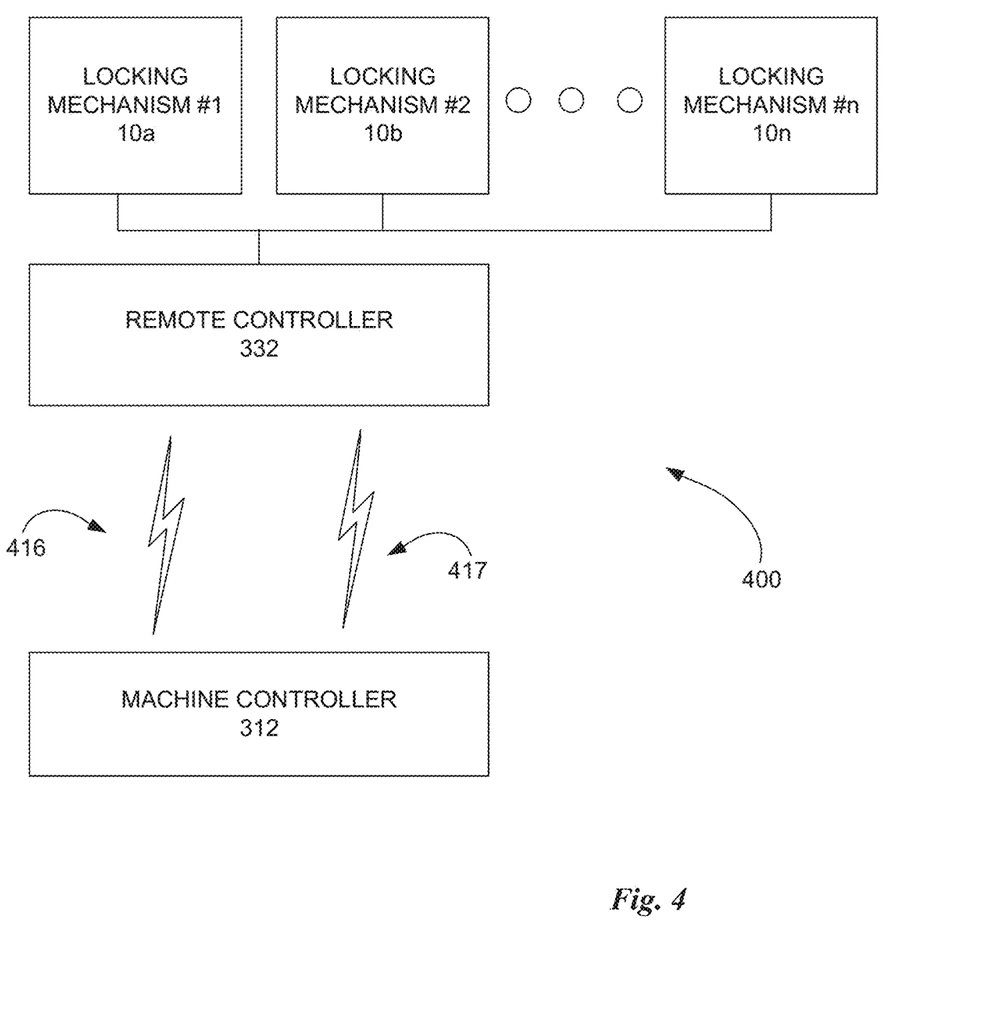
FIG. 4 is a block diagram of a plurality of redundant safety system suitable for use in machines deployed in a manufacturing environment according to an embodiment of the subject matter disclosed herein.

FIG. 4 is a block diagram of a redundant safety system 400 having a plurality of locking mechanisms 10a-10n suitable for use in machines deployed in a manufacturing environment according to an embodiment of the subject matter disclosed herein. The system 400 includes one or more safety devices (e.g., locking mechanisms, vertically raising rails, and the like) 10a, 10b, —10n. Each respective locking mechanism 10a-10n may be communicatively coupled to a local controller 332. In this manner, the local controller 332 is configured to receive a signal from each locking mechanism 10a-10n. If each locking mechanism 10a-10n indicator switch is closed (indicative of an insert device properly engaged with the locking mechanism), then a return signal is sensed through a series circuit that is completed. The local controller 332 may be configured to be locked out if one or more of the locking mechanisms 10a, 10b, —10n fails to indicate being properly engaged. In other embodiments, the local controller 332 may be only locked out if a majority of the locking mechanisms 10a, 10b, —10n does not indicate a complete signal circuit.

If the local controller 332 is engaged, it may then engage in wireless communication with a remote controller 312. That is, to realize the redundant safety features of this embodiment, a first wireless communication channel 416 (which may be realized between antennae 316 and 336 of FIG. 3) and a second wireless communication channel 417 (which may be realized between antennae 317 and 337 of FIG. 3) may both be used to ensure that all locking mechanisms 10a-10n are properly engaged. In this manner, each respective locking mechanism 10a, 10b, —10n may have the ability to interrupt functionality of a remote controller 312 if any one of the locking mechanisms 10a-10n fails to provide a positive indication signal to the local controller 332, thereby disabling the communication modules at the local controller for each of the redundant wireless communication channels 416 and 417.

Figure 5:
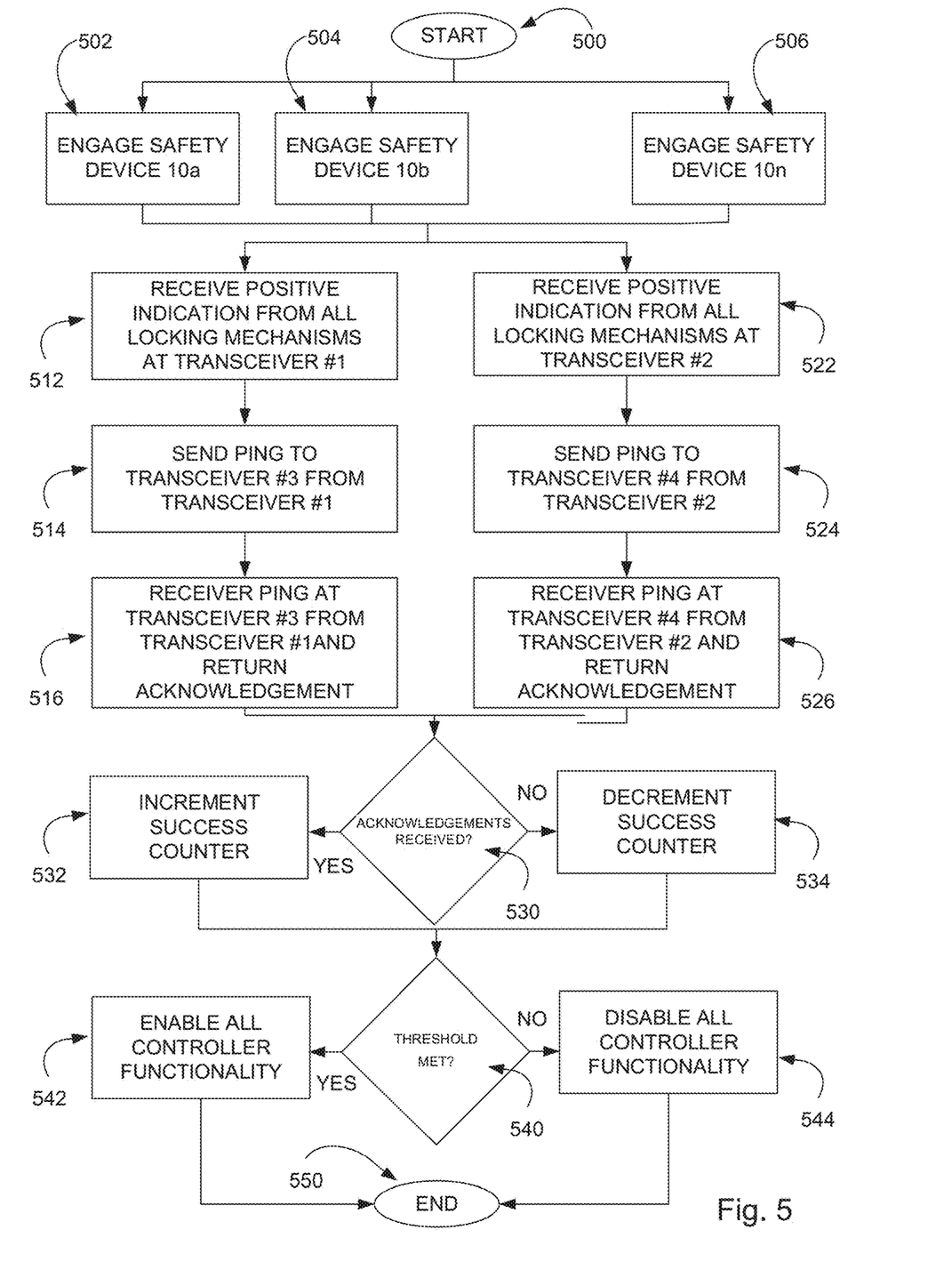
FIG. 5 is a flow chart of a method for realizing redundant safety utilizing one or more of the systems of FIGS. 1-4 according to an embodiment of the subject matter disclosed herein.

FIG. 5 is a flow chart of a method for realizing redundant safety utilizing one or more of the systems of FIGS. 1-4 according to an embodiment of the subject matter disclosed herein. The method may employ all of the steps as shown and, in the order, shown in FIG. 5, however a skilled artisan understands that more or fewer steps may be employed to realize similar methods and that the steps depicted may performed in different orders to also realize different methods. As such, in this embodiment, the method starts at step 500.

Next, depending on how many locking mechanisms 10a-10n may be employed in any given system, the method may independently verify that each of the locking mechanisms employed to use are, in fact, engaged property and a positive signal may be received from each locking mechanism. These engagement verification procedures are accomplished at steps 502, 504 and 506 respectively. However, one understands that the number of verification steps is equivalent to the number of locking mechanisms 10a-10n in a given overall redundant safety system. Once the respective engagement verification signals are received by first and second transceiver, redundant communication steps may next be realized in the method of FIG. 5.

In a first redundant communication path, the first receiver may receive positive engagement verification indications from each locking mechanism at step 512. The first transceiver may send a ping/indication signal (or a series of pings) to a third transceiver located remote from the first transceiver and that may be associated with a remote-control station of the overall system. This occurs at step 514. Then, the third receiver may receive the ping/indication signal that was sent from the first transceiver and initiate a return signal acknowledging receipt at step 516. In some embodiments, this acknowledge signal is not sent.

Similarly, in a second redundant communication path, the second receiver may receive positive engagement verification indications from each locking mechanism at step 522. The second transceiver may send a ping/indication signal (or a series of pings) to a fourth transceiver located remote from the second transceiver and that may be associated with a remote-control station of the overall system. This occurs at step 524. Then, the fourth receiver may receive the ping/indication signal that was sent from the second transceiver and initiate a return signal acknowledging receipt at step 526. In some embodiments, this acknowledge signal is not sent.

After completion of a cycle of pings/acknowledgement, a decision step 530 presents an opportunity of the redundant safety realization method to determine if both of the communication paths were successful in the ping and response communication handshake. If yes, then a success counter is incremented at step 532. If no, then the success counter may be decremented at step 534. In some embodiments, the success counter may never be less than zero and in other embodiments, the success counter may have an upper limit as well, such as five or ten. In some embodiments, the upper limit is simply 1, which makes the redundant safety system a binary choice on each cycle. That is, either both paths are functioning or not.

An analysis of the current count in the success counter may be accomplished at decision step 540. That is, is the current success count at or above a threshold number. If yes, then all controller functionality in the overall system may be enabled at step 542. In no, then all functionality in the overall system may be disabled at step 544. In this manner, if one of the redundant communication paths is compromised, then all functionality will be disabled as the success counter will fall below the requisite threshold in decision step 540. In some embodiments, the success counter and threshold reflect a series of successful ping and response tandems over a period of cycles, e.g., four out of five successful handshakes will sustain system functionality. In other embodiment a single failure on any cycle will disable functionality as the threshold may be set to one with a maximum count of one.

Figure 6:
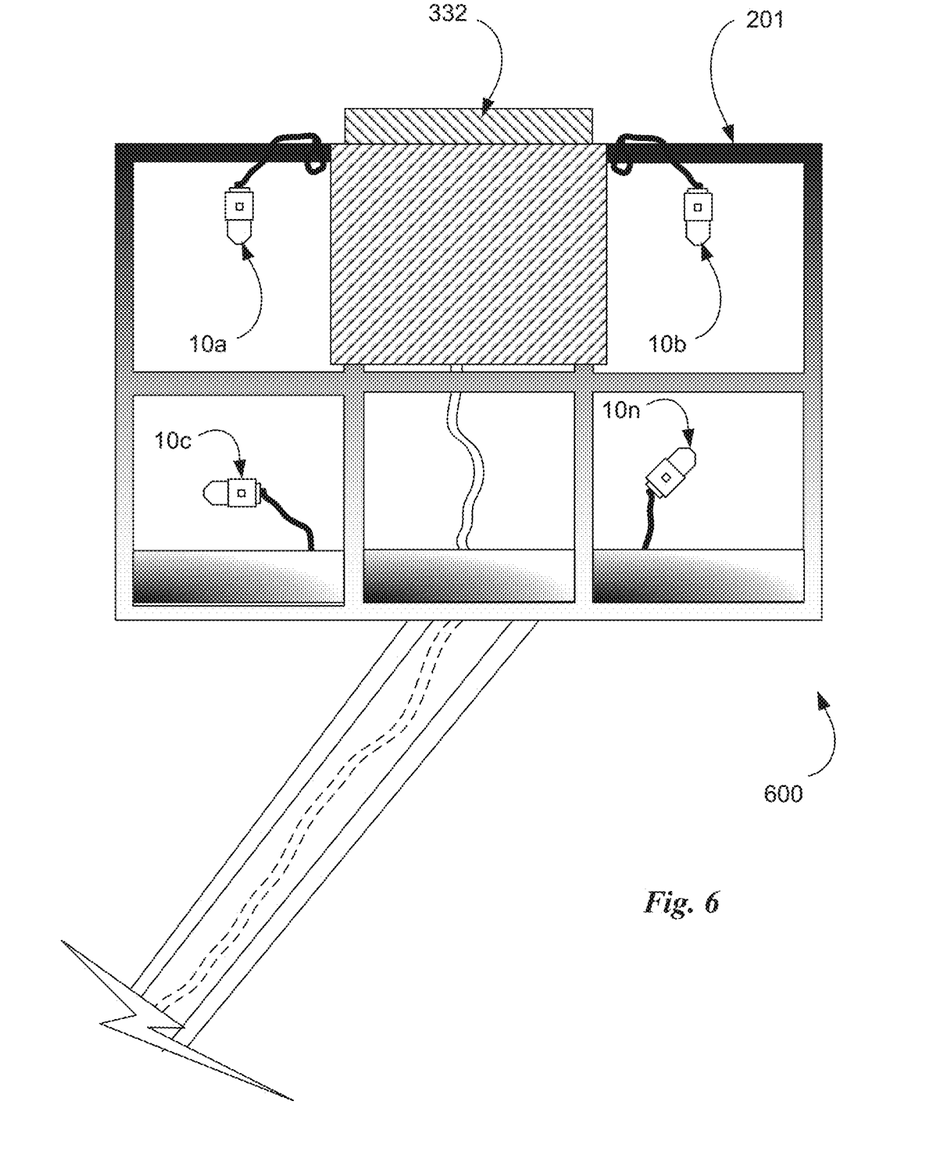
FIG. 6 is a system view of a human lift device that utilizes one or more of the redundant safety systems of FIGS. 1-4 according to an embodiment of the subject matter disclosed herein.

FIG. 6 is a system view of a portion (basket portion 201) of a human lift device that utilizes one or more of the redundant safety systems of FIGS. 1-4 according to an embodiment of the subject matter disclosed herein. The system 600 includes one or more locking mechanisms 10a, 10b, —10n. Each respective locking mechanism 10a-10n may be communicatively coupled to a local controller 332. In this manner, the local controller 332 is configured to receive a signal from each locking mechanism 10a-10n. If each locking mechanism 10a-10n indicator switch is closed (indicative of an insert device properly engaged with the locking mechanism), then a return signal is sensed through a series circuit that is completed. The local controller 332 may be configured to be locked out if one or more of the locking mechanisms 10a, 10b, —10n fails to indicate being properly engaged. In other embodiments, the local controller 332 may be only locked out if a majority of the locking mechanisms 10a, 10b, —10n does not indicate a complete signal circuit.

If the local controller 332 is engaged, it may then engage in wireless communication with a remote controller (not shown) as generally described above with respect to FIGS. 1-5.

It is to be understood that many changes in the particular structure, materials, and features described herein may be made without departing from the spirit and scope of the subject matter. Therefore, it is the Applicant's intention that its patent rights not be limited by the particular embodiments illustrated and described herein, but rather by the following claims interpreted according to accepted doctrines of claim interpretation, including the Doctrine of Equivalents and Reversal of Parts.

What is claimed is:

1. A safety system, comprising:
a machine configured to perform a manufacturing function;
a base station configured to operate in conjunction with the machine;
a first transceiver disposed in the machine;
a second transceiver disposed in the machine;
a third transceiver disposed in the base station;
a fourth transceiver disposed in the base station; and
an interrupt switch disposed in the machine and configured to enable functionality of the machine if and only if the first transceiver maintains periodic communication with the third transceiver and if the second transceiver maintains periodic communication with the fourth transceiver.

2. The safety system of claim 1, further comprising a light disposed in the machine configured to be illuminated if and only if the first transceiver maintains periodic communication with the third transceiver and if the second transceiver maintains periodic communication with the fourth transceiver.

3. The safety system of claim 1, further comprising a contact disposed in the machine configured to be closed if and only if the first transceiver maintains periodic communication with the third transceiver and if the second transceiver maintains periodic communication with the fourth transceiver.

4. The safety system of claim 1, further comprising a light disposed in the base station configured to be illuminated if and only if the first transceiver maintains periodic communication with the third transceiver and if the second transceiver maintains periodic communication with the fourth transceiver.

5. The safety system of claim 1, further comprising a contact disposed in the base station configured to be closed if and only if the first transceiver maintains periodic communication with the third transceiver and if the second transceiver maintains periodic communication with the fourth transceiver.

6. The safety system of claim 1, wherein the communication further comprises a near-field electronic communication.

7. The safety system of claim 1, wherein the communication further comprises a wireless electronic communication.

8. The safety system of claim 1, wherein the communication further comprises an electronic communication compatible with an IEEE 1492 standard.

9. The safety system of claim 1, wherein machine further comprises a personnel lift system.

10. The safety system of claim 1, wherein the machine further comprises a harness having a multiple verification point system that is configured to enable functionality of the first transceiver when the multiple points of verification are satisfied.

11. The safety system of claim 1, wherein the machine further comprises a harness having a multiple verification point system that is configured to enable functionality of the second transceiver when the multiple points of verification are satisfied.

12. The safety system of claim 1, wherein the periodic communication comprises a plurality of handshake pings every second wherein a threshold of missed handshake pings will trigger an interrupt.

13. A safety system, comprising:
a machine configured to perform a manufacturing function;
a safety rail configured to operate in conjunction with the machine;
a first transceiver disposed in the machine;
a second transceiver disposed in the machine;
a third transceiver disposed in the safety rail;
a fourth transceiver disposed in the safety rail; and
an interrupt switch disposed in the machine and configured to enable functionality of the machine if and only if the first transceiver maintains periodic communication with the third transceiver and if the second transceiver maintains periodic communication with the fourth transceiver.

14. The safety system of claim 13, wherein the communication further comprises a near-field electronic communication.

15. The safety system of claim 13, wherein the communication further comprises a wireless electronic communication.

16. The safety system of claim 13, wherein the communication further comprises an electronic communication compatible with an IEEE 1492 standard.

17. The safety system of claim 13, wherein machine further comprises a personnel lift system.

18. The safety system of claim 13, wherein the machine further comprises a harness having a multiple verification point system that is configured to enable functionality of the first transceiver when the multiple points of verification are satisfied.

19. The safety system of claim 13, wherein the machine further comprises a harness having a multiple verification point system that is configured to enable functionality of the second transceiver when the multiple points of verification are satisfied.

20. The safety system of claim 13, wherein the periodic communication comprises a plurality of handshake pings every second wherein a threshold of missed handshake pings will trigger an interrupt.

\* \* \* \* \*